June 29, 1943.　　　A. E. BRYCE　　　2,323,197
FASTENER
Filed Oct. 3, 1942　　　3 Sheets-Sheet 1
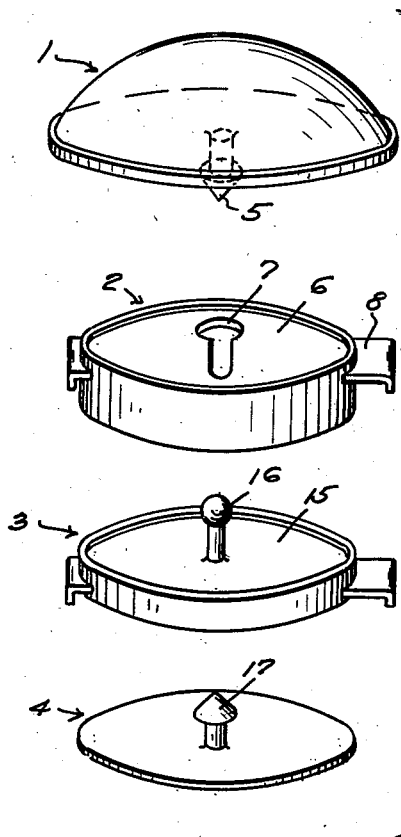
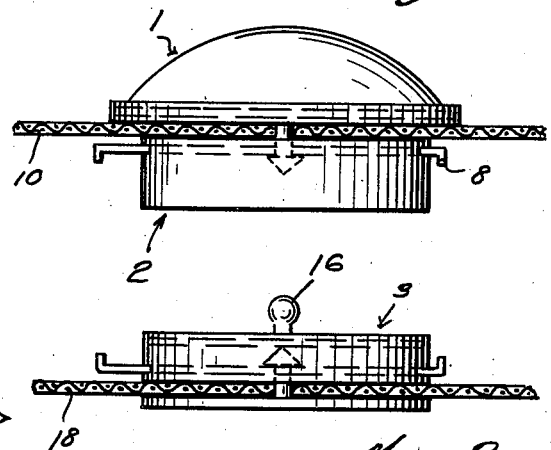
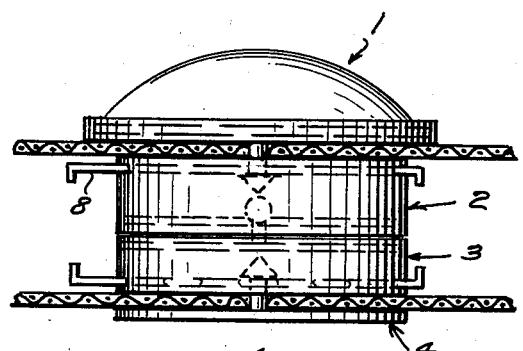
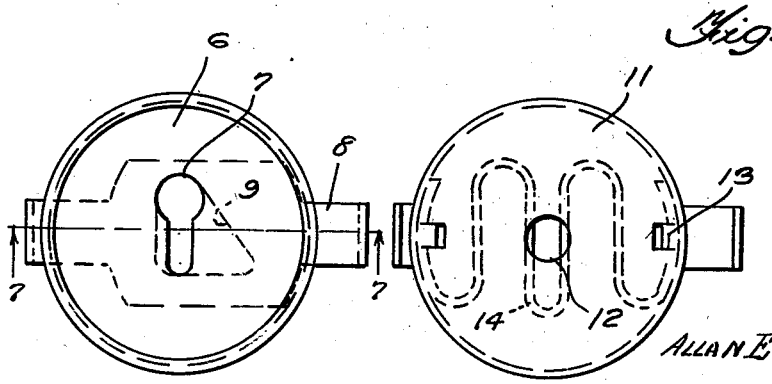
Inventor
ALLAN EDWARD BRYCE
By Clarence A. O'Brien
and Harvey B. Jacobson
Attorneys

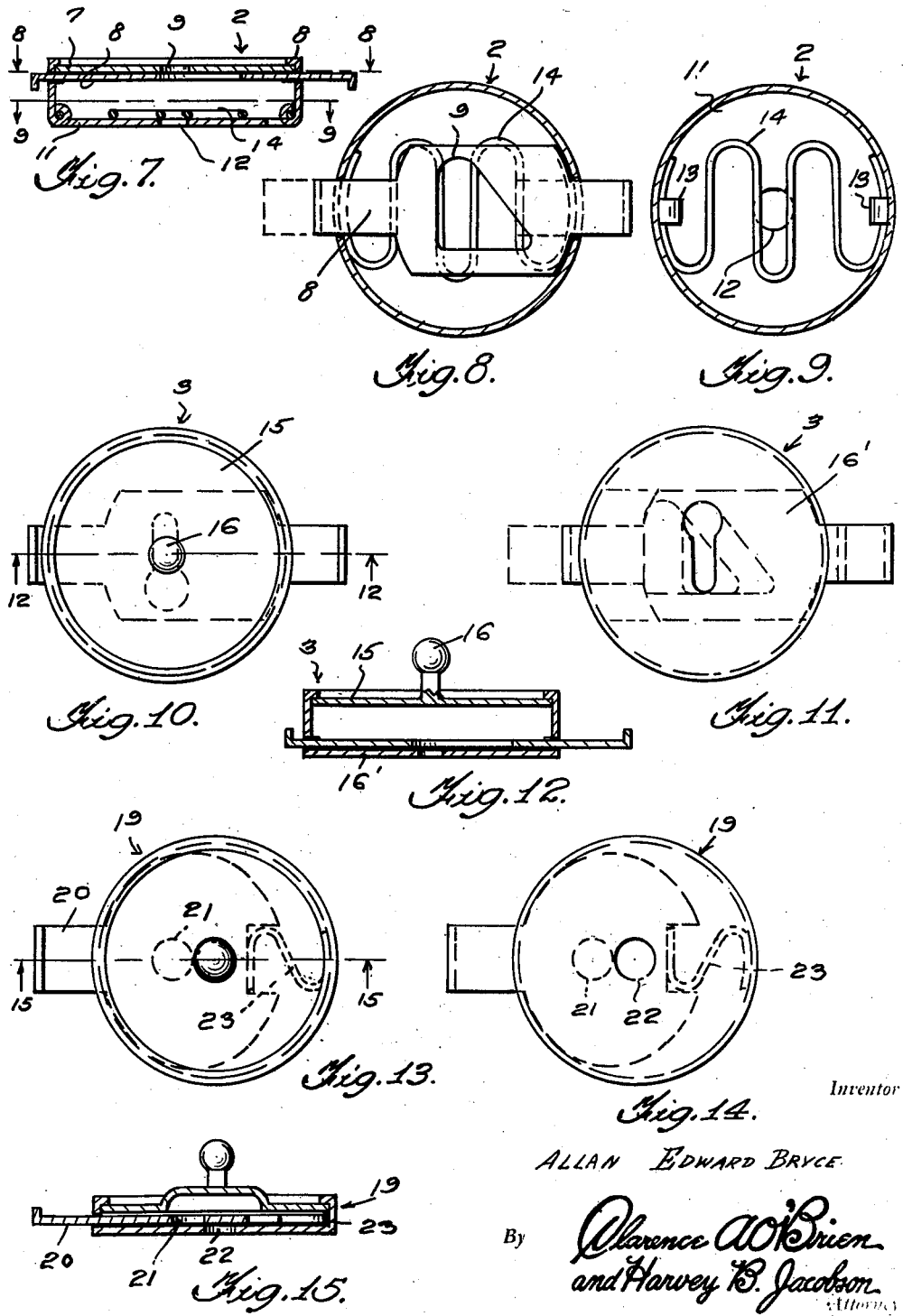

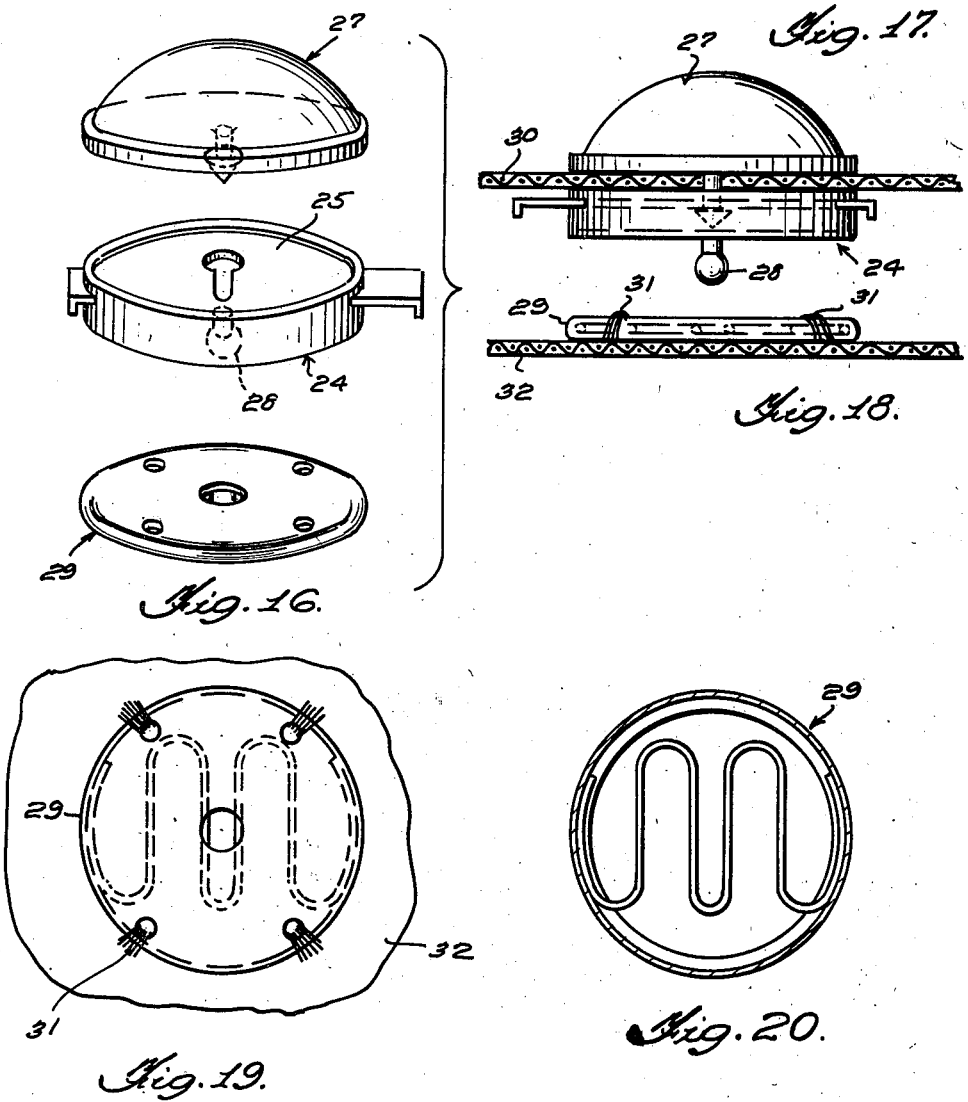

Patented June 29, 1943

2,323,197

UNITED STATES PATENT OFFICE 2,323,197

FASTENER

Allan Edward Bryce, Providence, R. I.

Application October 3, 1942, Serial No. 460,649

2 Claims. (Cl. 24—222)

My invention relates to fasteners for use in securing the edges of garments, or pieces of cloth, together, and more especially to the button forming type of fastener disclosed in my United States Letters Patent No. 2,288,990, dated July 17, 1942, over which the instant invention is designed as an improvement.

The principal object of the instant invention is to adapt the fastener of my aforesaid patent for use in various ways and particularly with a glove fastener element and without materially increasing the cost of manufacture of the device.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in perspective of the members of my improved fastener, in its preferred embodiment, disassembled.

Figure 2 is a view in side elevation, partly in section, of one of the members of one pair applied to a piece of fabric.

Figure 3 is a similar view of the members of the other pair.

Figure 4 is another similar view of the two pairs applied and secured together.

Figure 5 is a plan view of one member.

Figure 6 is a similar view of another member.

Figure 7 is a view in transverse section taken on the line 7—7 of Figure 6.

Figure 8 is a view in horizontal section taken on the line 8—8 of Figure 7.

Figure 9 is a similar view taken on the line 9—9 of Figure 7.

Figure 10 is a view in plan of another of the fastener members.

Figure 11 is a similar view of said member looking at the opposite side thereof.

Figure 12 is a view in transverse section taken on the line 12—12 of Figure 10.

Figure 13 is a view in plan of a modified fastener member.

Figure 14 is a similar view of said member looking at the other side thereof.

Figure 15 is a view in transverse section taken on the line 15—15 of Figure 13.

Figure 16 is a view in perspective of one of the fastener members of another modified embodiment of the invention.

Figure 17 is a view in side elevation showing a pair of fastener members of said other modified embodiment applied to a piece of fabric.

Figure 18 is a similar view showing another fastener member of said modified embodiment applied to a piece of fabric.

Figure 19 is a plan view of said other member applied, and

Figure 20 is a view in horizontal section of the member shown in Figure 19.

Referring now to the drawings by numerals, and first to Figures 1 to 12 thereof, my improved fastener, in the preferred embodiment thereof, comprises two pairs of opposed complemental fastener members, 1 and 2 designating the members of one pair, and 3 and 4 designating the members of the other pair.

The member 1, as in the case of my aforesaid patent, is of button-like, dome-shaped form with an axial headed stud 5 extending from the flat side thereof, and the member 2 comprises a flat circular shell having in one side 6 thereof a central keyhole slot 7 for accommodating the stud 5, said shell further embodying adjacent said side 6 a diametrical endwise movable slide 8 provided with a central triangular slot 9 adapted to cam the stud 5 from the larger part of the keyhole slot 7 into the smaller part of said slot to lock said stud in said member 2. As will be clear, the member 2 is designed to function on said side 6 thereof as a female fastener member complemental to the member 1 which forms a male fastener member, and said members 1, 2 are designed, as shown in Figure 2, to be opposed to opposite sides of a piece of cloth 10, or the like, with the stud 5 piercing the cloth and locked in the member 2 in the manner described.

According to my invention, the other side 11 of the member 2 is equipped to provide the female element of a snap fastener, said side being provided with an axial hole 12 therein and said member having suitably fixed therein, as by bent-in lugs 13, the ends of the usual type spring 14 including a central loop opposite the hole for snap action engagement with a stud.

The member 3 comprises a shell, similar to that of member 2, but equipped, on one side 15 thereof as a male fastener element by means of an axial headed stud 16, the other side 16' being equipped as a female fastener element by duplicating therein the keyhole slot and slide of the described member 2. The member 4 has the form of a usual male glove fastener element of disk type with an axial headed stud 17. As will be understood, by reference to Figure 3 particularly, the members 3 and 4 are designed to be opposed upon opposite sides of another piece of cloth 18 with the stud 17 of member 4 extended therethrough and locked in the member 3 in the same manner as described with reference to the stud 5 and the member 2.

In the use of the described embodiment of the invention, as shown in Figure 4, with the pairs of members 1, 2 and 3, 4 applied to the cloth 10 and 18 in the manner described, the two pieces of cloth are fastened together by coupling the stud 16 of the member 3 to the side 11 of the member 2 by means of the stud 16, hole 12, and spring 14.

In Figures 13, 14, 15, a member 19 is shown, similar to member 3, but equipped with, in lieu of the spring 12, a slide 20 having a hole 21 therein adapted to be registered under inward movement of the slide with a hole 22 in the member to accommodate the stud 17 of the member 4, a suitable Z-type spring 23 in the member urging said slide outwardly to lock the stud in the hole 22 in a manner which will be understood.

In Figures 16 to 20, another modified embodiment has been shown in which a member 24 is provided and which is similar to member 2 in that it is equipped on one side 25 in the same manner as member 2 as a female fastener element complemental to a member 27 similar to member 1. On its other side the member 24 is equipped by a headed stud 28 as a male fastener element complemental to the usual female glove fastener 29.

In the use of the last-described embodiment, the members 27, 24 are designed to be opposed upon opposite sides of a piece of cloth, or the like, 30, as shown in Figure 17, in the same manner as described with reference to the members 1 and 2. The female glove fastener 29 is designed to be sewed, as at 31, to another piece of cloth 32, to be fastened in the usual manner to the stud 28 of the member 24.

The foregoing will, it is believed, suffice to impart a clear understanding of my invention without further explanation.

Obviously, other modifications of the invention than disclosed herein may be resorted to without departing from the inventive concept, and, therefore, the present disclosure is not to be construed as restrictive, right being reserved herein to all modifications falling within the scope of the appended claims.

What I claim is:

1. A fastener for attaching two pieces of cloth together comprising a pair of complemental fastener members adapted to be opposed upon opposite sides of one piece of cloth and one including a cloth piercing element to which the other is detachably attached, and a second pair of fastener members similar to the first-mentioned pair adapted to be similarly attached upon opposite sides of the second piece of cloth and complemental male and female elements embodied in one member of each pair for detachably attaching the same together with a snap action.

2. A fastener for attaching two pieces of cloth together comprising a pair of complemental fastener members adapted to be opposed upon opposite sides of one piece of cloth and one including a cloth piercing element to which the other is detachably attached, and a second pair of fastener members similar to the first-mentioned pair adapted to be similarly attached upon opposite sides of the second piece of cloth and complemental male and female elements embodied in one member of each pair for detachably attaching the same together with a snap action, and including a headed stud on one member of said pair, the other member having a stud receiving opening and a stud gripping spring therein.

ALLAN EDWARD BRYCE.